Figure 1:
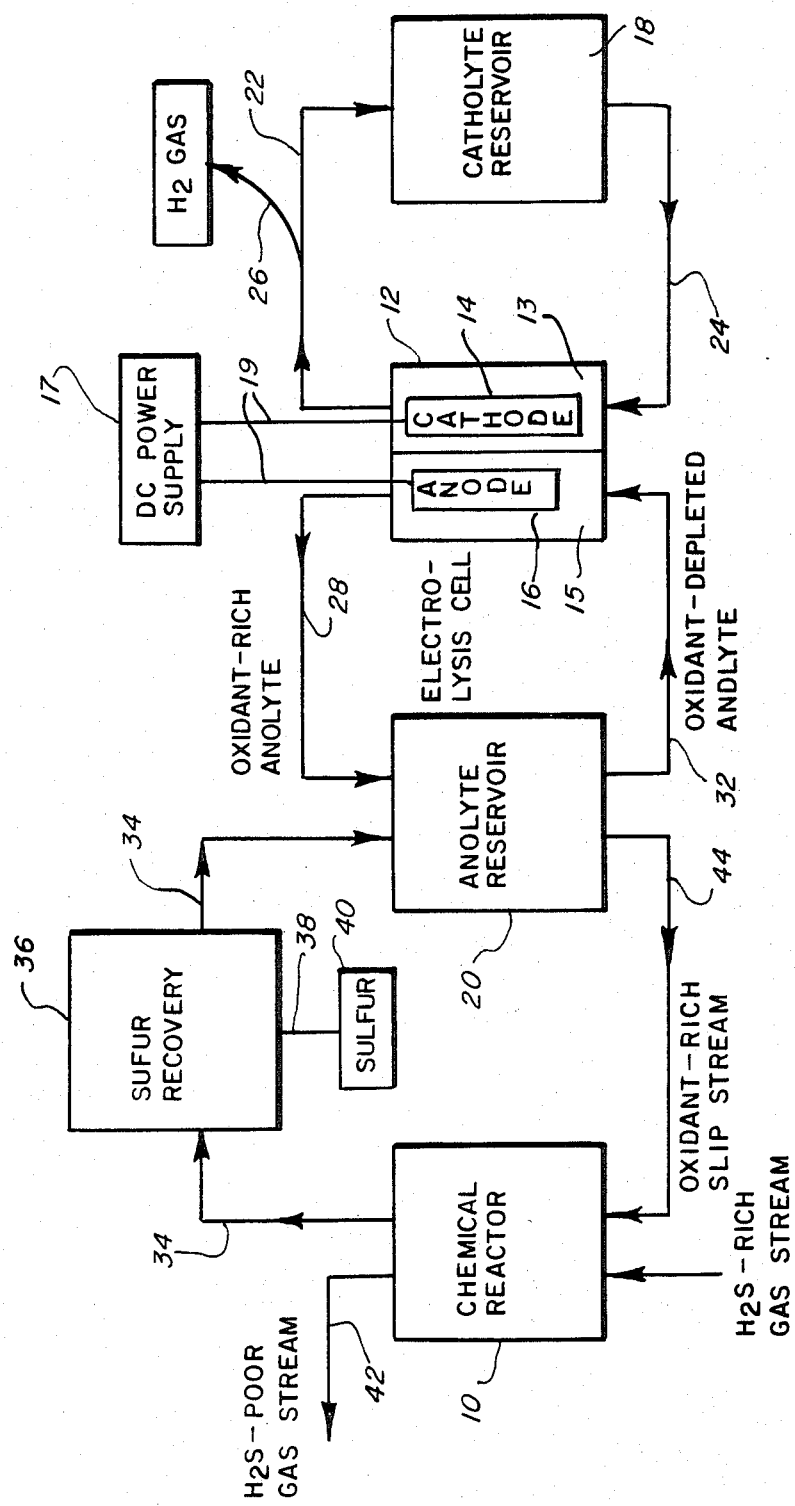

United States Patent [19]

Maas, Jr. et al.

[11] Patent Number: 4,526,774
[45] Date of Patent: Jul. 2, 1985

[54] SEPARATION OF HYDROGEN SULFIDE FROM GASEOUS AND NON-AQUEOUS LIQUID STREAMS

[75] Inventors: Edward T. Maas, Jr., Batavia; Davida W. Kalina, Naperville, both of Ill.

[73] Assignee: Standard Oil Company (Indiana), Chicago, Ill.

[21] Appl. No.: 604,460

[22] Filed: Apr. 27, 1984

[51] Int. Cl.³ .................... C01B 17/05; C25B 1/00
[52] U.S. Cl. .................... 423/573 R; 423/220; 423/224; 423/578 R; 204/101; 204/136; 210/758
[58] Field of Search ............ 423/573, 578, 573 R, 423/648 R, 220, 224; 204/101, 136, 130; 210/758

[56] References Cited

U.S. PATENT DOCUMENTS

| | | |
|---|---|---|
| 1,034,646 | 8/1912 | Rabenah ................... 423/573 |
| 1,497,649 | 6/1924 | Marx ...................... 423/578 X |
| 2,809,885 | 10/1957 | Ditman et al. ............ 423/578 |
| 3,401,101 | 9/1968 | Keller, Jr. ............... 204/136 |
| 3,409,520 | 11/1968 | Bolmer ................... 204/101 |
| 4,220,505 | 9/1980 | Deem ..................... 423/220 X |

Primary Examiner—Earl C. Thomas
Attorney, Agent, or Firm—Robert R. Cochran; William T. McClain; William H. Magidson

[57] ABSTRACT

An indirect hydrogen sulfide conversion process for the production of elemental hydrogen and sulfur. The process is based upon the electrochemical oxidation of iodide in an aqueous solution with a pH in the range of 0 to 1 at high current densities and current efficiencies. Hydrogen gas is produced concurrently with soluble triiodide. Treatment of a gaseous or non-aqueous liquid stream with electrolyte solutions containing triiodide yields a sulfur product in plastic form. The sulfur product can be recrystallized from a solvent to yield sulfur of comparable purity to that presently produced.

6 Claims, 2 Drawing Figures

SEPARATION OF HYDROGEN SULFIDE FROM GASEOUS AND NON-AQUEOUS LIQUID STREAMS

This invention relates to the treatment of gaseous streams and non-aqueous liquid streams with very low solubility in aqueous electrolytes for the removal of hydrogen sulfide therefrom.

Hydrogen sulfide represents, in a less-than-agreeable form, a source of two elements which individually have significant economic value. Claus technology is frequently used wherein the hydrogen sulfide is partially oxidized to yield water and sulfur. A new process including the economical recovery of elemental hydrogen to utilize its chemical value would represent a significant supplement to the hydrogen requirements needed in crude oil upgrading and coal liquification and gasification.

Various approaches for hydrogen recovery from hydrogen sulfide have been considered. Direct oxidation of sulfide ions forms the basis of an electrochemical process reported by Bolmer, U.S. Pat. No. 3,409,520 (1968).

We have directed our work to an improvement on the indirect electrochemical conversion process disclosed by Keller, Jr. in U.S. Pat. No. 3,401,101. While the Keller, Jr. process has been commercialized, this has only been to a very limited extent, probably for economic reasons. Keller, Jr. requires the use of buffered halide solutions to maintain a pH between 7 and 8.5. He states, "lower pH values greatly reduce the effectiveness of the solution in removing HS from the fluid being treated."

As part of the work carried out by us, considerable study of the Keller, Jr. process was carried out. Patent examples 14, 15a and 15b disclose commercial size material gas sweetening operations with the following details:

| Example | 14 | 15a | 15b |
|---|---|---|---|
| MM SCF/Day | 12 | 4.5 | 4.5 |
| % (vol) $H_2S$ | .033 | .044 | .044 |
| Aqueous Solution Composition | $K_2B_4O_7$ 4.5% KI 3.0% | $Na_3PO_4$ 4.5% $Na_2CO_3$ 2.0% KI 1.0% | $K_2CO_3$ 4.5% KCl 8.0% KI 1.5% |
| pH | 7.8 | 7.6 | (7.0 to 8.5) |
| Electrolysis Volts | 32 | 29 | 29 |
| Kwh/lb of Sulfur | 25 | 21 | 21 |

The power consumption disclosed by Keller, Jr. is extremely high when compared to that obtained for our process as will be apparent with reference to the examples set forth hereinafter. A further advantage of our process is the lower operating voltage requirement.

An object of the present invention is to provide an improved process for the removal of hydrogen sulfide from gas streams containing the same.

Other objects and advantages will be apparent to one skilled in the art upon reading this disclosure.

Broadly, the invention comprises a process for converting the $H_2S$ in a gaseous or non-aqueous liquid stream to hydrogen and elemental sulfur comprising feeding to a reaction zone said stream and an anolyte containing $I_3^-$ as an oxidant at a pH of 0 to 1 from a first reservoir to effect the following reaction:

$$I_3^- + H_2S \rightarrow 2H^+ + 3I^- + S$$

removing $H_2S$-free stream from said reaction zone, removing anolyte-containing solid sulfur from said reaction zone, removing sulfur from said anolyte containing the same, returning sulfur-free anolyte to said first reservoir, providing an electrolysis cell having a membrane therein to separate said cell into anode and cathode chambers, establishing a voltage across said cell, providing a second reservoir; passing an acid from said second reservoir to said cathode chamber and from said cathode chamber back to said second reservoir, passing an $I_3^-$ depleted stream from said first reservoir to said anode chamber and $I_3^-$ rich stream from said anode chamber to said first reservoir.

The anolyte can comprise a mixture of iodine and hydrogen iodide and the catholyte can be hydrochloric or sulfuric acid. The sulfur obtained in the process, identified by us as "acid" sulfur contains some impurities but, as will be seen, this sulfur can be purified by treating with an organic solvent such as toluene or xylene.

It will be seen that the process differs distinctly from that of Keller, Jr. in the pH range. This gives a significant improvement in the operation of the electrochemical generation of the triiodide oxidant and the elemental hydrogen gas. Operation in the pH range 0 to 1 results in a dramatic lowering of the required cell voltage to be applied to carry out the desired electrochemical reactions to less than 3 volts. Keller, Jr. employs a voltage range of 3 to 100 volts. The ability to carry out our process at a low cell voltage results in a dramatically reduced power consumption on a per pound basis for the production of the desired sulfur product. Our demonstrated power consumption of 1 to 4 Kwh/lb of sulfur contributes significantly to the attraction of our process and hence its commercial implementation.

Accompanying and forming part of this disclosure is a drawing comprising:

FIG. 1, flow sheet of the process of this invention, and

Figure 2:
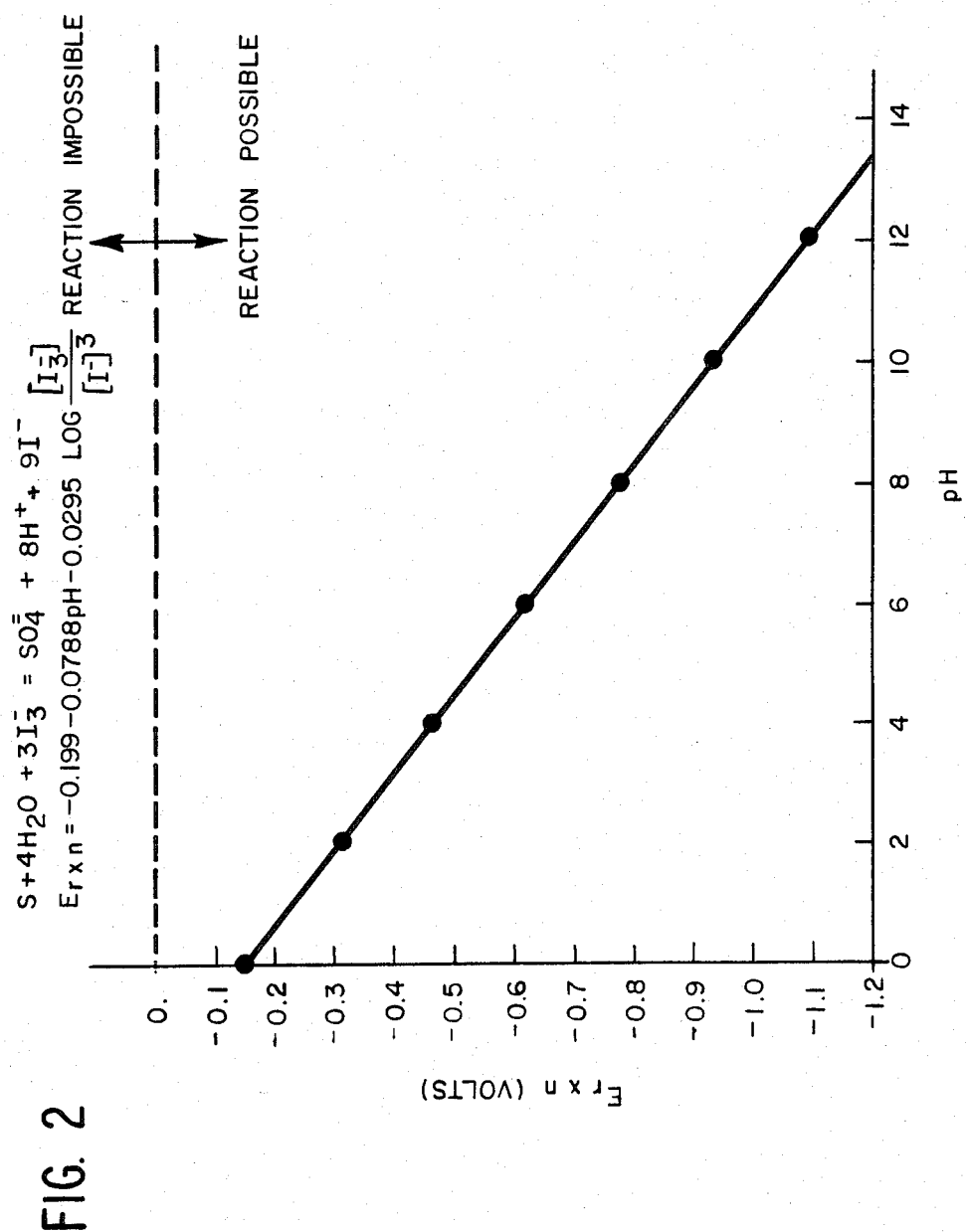

FIG. 2, a graph showing the relationship between pH and reaction voltage for the reaction of sulfur, water, and triiodide.

Directing attention to FIG. 1, the principle sections of the system include a chemical reaction section 10 and an electrochemical reaction section 12. The chemical reaction section 10 permits contact of the hydrogen sulfide-rich gas stream with the liquid oxidant. The electrochemical reaction section includes a cathode 14 and an anode 16 contained, respectively, in a cathode compartment 13 and an anode compartment 15. Also provided were catholyte reservoir 18 and anolyte reservoir 20. Conduit 22 provides liquid communication between the cathode compartment 13 and catholyte reservoir 18 and conduit 24 provides liquid communication between catholyte reservoir 18 and cathode compartment 13. Gas removal conduit 26 is in communication with conduit 22. Conduit 28 provides liquid communication between anode compartment 15 and anolyte reservoir 20. Conduit 32 provides liquid communication between anolyte reservoir 20 and anode compartment 15. The volume of anode compartment 15 and cathode compartment 13 not occupied by, respectively, anode 16 and cathode 14 is filled by the appropriate electrolyte from anolyte reservoir 20 and catholyte reservoir 18. A direct current power supply 17 is connected to anode 16 and cathode 14 by electrically conducting conduits 19. Conduit 34, having sulfur recovery zone 36 therein, extends between chemical reaction section 10 and anolyte reservoir 20. Conduit 38 extends to sulfur product station 40. Treated gas stream outlet conduit 42 extends to the upper portion of chemical reaction section 10. Conduit 44 extends between and provides liquid communication between anolyte reservoir 20 and chemical reaction Section 10.

In the electrochemical section 12, the soluble oxidant $I_3^-$ is generated from acidic iodide solution. Concurrent with this oxidation is the reduction of protons to yield hydrogen gas. These two electrochemical reactions, the anodic reaction:

$$3I^- \rightarrow I_3^- + 2e^-$$

and the cathodic reaction:

$$2H^+ + 2e^- \rightarrow H_2$$

performed simultaneously at the respective electrodes in the electrochemical cell, make up the overall electrochemical processes:

$$3I^- + 2H^+ \rightarrow I_3^- + H_2$$

In the chemical reaction section 10 a gas stream rich in hydrogen sulfide is contacted with the triiodide solution and sulfur is generated according to the reaction:

$$I_2(\text{as } I_3^-) + H_2S \rightarrow 2H^+ + 2I^- + S$$

In the following examples, the electrochemical section 10 included a commercially available multipurpose electrolytic cell developed and marketed by the Swedish National Development Corporation. This cell employs a parallel plate electrode configuration with an anode-cathode separation of about 13 mm and an electrode surface area of 100 sq. cm. The cell allows delivery of separate anolyte and catholyte feed streams and maintains electrolyte isolation inside the cell by means of a separator or ion-exchange membrane inserted between the electrodes. In other words, the membrane essentially seals each electrode compartment from the other and prevents mixing of the anolyte with the catholyte. A power supply 17 together with reservoirs 18 and 20 and the associated conduits complete the electrolytic section. In view of the acidic nature of the operation, chemical resistant materials are necessary. Polyvinylidine fluoride and polypropylene are two suitable non-metallic materials. Reservoir 18 permits easy removal and metering of the hydrogen gas. Reservoir 20 insures an ample supply of oxidant-rich anolyte to the slip stream 44 to the chemical reaction section 10.

Electrolyte temperatures and electrode voltages can be monitored in-line via thermocouples inside mercury-filled ceramic wells and standard calomel reference electrodes immersed in each electrolyte flow downstream from the cell. In general, it was found that operation at ambient temperatures (20°-50° C.) resulted in acceptable performance of both the electrochemical process section and the chemical process section.

The reaction between the triiodide oxidant stream and the hydrogen sulfide is carried out in a vertical reactor. The triiodide solution is the continuous phase and the hydrogen sulfide-containing gas is injected into the liquid phase through means to disperse the gas. We used a sintered-glass gas dispersion tube. In the work reported, the hydrogen sulfide containing gas was a mixture of 25 vol. percent hydrogen sulfide and 75 vol. percent nitrogen.

Both the stream to be treated and the oxidant-rich stream inlets are located near the bottom of the reactor which can include stirring apparatus. The treated stream is removed from the top of the chemical reaction section while electrolyte passes through a side arm attached near the top of the reactor. At the end of each run sulfur not recovered in sulfur recovery zone 36 was removed manually from the chemical reaction section where it had deposited in the form of a sticky, plastic mass.

Determination of hydrogen sulfide in the off-gas can be determined by absorbing this gas stream in a caustic scrubber and the amount absorbed in this scrubber determined by potentiometric titration using standardized $Pb^{2+}$ solution.

Using the cell described above, oxidation of acidic iodide to form the soluble triiodide, together with the reduction of protons to yield hydrogen gas was effectively carried out. Current efficiencies for iodine (triiodide) and hydrogen production approached 100%. The anode for the iodide oxidation was high density graphite having a density of 1.8 grams per cubic centimeter to reduce the possibility of electrolyte leakage through the graphite anode. Current densities as high as 500 milliamps per square centimeter were attained at 0.71 volt versus the standard calomel electrode with no indication of any concentration polarization. The cathode utilized in the cell was platinized platinum on titanium. Three proton conductive membranes were used including "Nafion ® 390", a fabric reinforced membrane 0.30 mm thick; "Nafion ® 117", an unsupported membrane 0.19 mm thick; and "Raipore ® R 1010", an unsupported membrane 0.05 mm thick.

Sulfur produced by the reaction of hydrogen sulfide and acidic triiodide is of a different physical and possibly chemical form from that normally encountered. We refer to this material as "acid" sulfur. "Acid" sulfur deposits itself as a reddish-brown, sticky mass which converts over a period of hours into a hard solid of the same color.

This acid sulfur contains 90 to 92 weight percent recoverable sulfur, the balance being entrained electrolyte as well as iodine.

The material can be transformed into a freely flowing liquid by heating it to 95° to 105° C. This melting factilitates handling of the "acid" sulfur and at the same time results in some iodine release although it still contains significant quantities of this material and further treatment such as recrystallization is needed to form an acceptable product. Treatment of the acid sulfur product (either as a solid or a liquid) with a solvent which exhibits significant sulfur solubility (i.e., greater than about 5 wt%) in a temperature range above that of the melting point of the acid sulfur (95°-105° C.) and which exhibits no deleterious side reactions with the sulfur or with the iodine contaminants in the temperature range employed results in dissolution of the acid sulfur product. Exhaustive treatment of the acid sulfur with this solvent under the conditions above results in complete dissolution of the acid sulfur product and release of any entrained electrolyte and/or chemically combined iodine. Cooling of the now single-phase system results in precipitation of crystalline elemental sulfur containing 100 to 150 parts per million of residual iodine. Typical solvents which fulfill the requirements as set out above to effect the "acid" sulfur treatment are toluene and xylene. The level of iodine contamination of the final crystalline sulfur product (100–150 ppm) falls well within the range of contamination of present commodity sulfur which is produced at the 99.95% purity level (i.e., 500 ppm impurities).

The following examples illustrate operation and use of the system described above. The invention is not limited to the specific details set forth.

EXAMPLE 1

In this example, the MP cell (Swedish National Development Company) was fitted with a graphite plate anode "(Ultra Carbon Company, grade UF-4S)", a platinum-coated titanium plate cathode (Swedish National Development Company) that had been platinized to increase its surface roughness, and a "Nafion ® 390" cation-exchange membrane. The initial anolyte composition was 1.95M $I_2$+5.5M HI. The initial catholyte composition was 3M HCl. Electrolyte flow rates were 1–14 l/min; in this range, the electrochemical performance was not sensitive to electrolyte flow rate. A current of 50 A was passed through the MP cell. The run was ended after $8.1 \times 10^5$ coulombs of charge were passed. The voltage between the anode and cathode ($V_{A-C}$) was 2.49 V; that between the anode and the standard calomel reference electrode in the anolyte stream ($V_A$), 0.90 V; and that between the cathode and the reference electrode in the catholyte stream ($V_C$), −0.80 V. The total amount of hydrogen recovered was 4.2 mole, representing 100% cathodic current efficiency. Total triiodide generated was 4.2 mole, for 100% anodic current efficiency. A total of 2.68 mole $H_2S$ (25% $H_2S$ in $N_2$) was passed through the chemical reactor during this period, and 2.66 mole of elemental sulfur was recovered. This represents a 99% sulfur recovery efficiency based on the amount of $H_2S$ treated.

Based on the data given, it is apparent that power used amounted to 2.63 Kwh/lb of sulfur.

EXAMPLE 2

In this example, the experimental set-up was the same as that in Example 1, except that a "Diabon" graphite plate anode (Swedish National Development Company) was used. At 50 A, $V_{A-C}$ after $5.4 \times 10^5$ coulombs had passed was 2.31 V; $V_A$, 0.79 V; and $V_C$, −0.62 V.

EXAMPLE 3

In this example, the experimental set-up was the same as that in Example 1, except that the initial anolyte composition in this example was 2.25M $I_2$+5.5M HI, and the cation-exchange membrane was "Nafion 117". At 50 A, $V_{A-C}$ after $1.35 \times 10^5$ coulombs had passed was 2.40 V; $V_A$, 0.90 V; and $V_C$, −0.62 V.

EXAMPLE 4

In this example, the experimental set-up was the same as that in Example 3, except that the cation-exchange membrane was "RAI Raipore R 1010". At 50 A, $V_{A-C}$ after $1.35 \times 10^5$ coulombs had passed was 2.33 V; $V_A$, 0.85 V; and $V_C$, −0.64 V.

EXAMPLE 5

In this example, a "Diabon" graphite plate anode (Swedish National Development Company) and an initial anolyte composition of 2.4M $I_2$+5.5M HI were used. The remainder of the experimental set-up was the same as that in Example 1. At 50 A, $V_{A-C}$ was 2.60 V after $5.4 \times 10^5$ coulombs had passed; $V_A$, 0.83 V; and $V_C$, −0.76 V.

EXAMPLE 6

In this example, a graphite plate anode "(Ultra Carbon Company, grade UF-4S)", an initial anolyte composition of 1.3M $I_2$+5.5M HI, and a "Nafion 117" cation-exchange membrane were used with the same cathode and catholyte composition as that in Example 1. After $1.35 \times 10^5$ coulombs of charge had passed, $V_{A-C}$ at 50 A was 2.43 V; $V_A$, 0.93 V; and $V_C$, −0.74 V.

EXAMPLE 7

In this example, the experimental set-up was the same as that in Example 5, except that the initial anolyte concentration was 1M $I_2$+5.5M HI. At 50 A, $V_{A-C}$ was 2.20 V after $5.4 \times 10^5$ coulombs had passed; $V_A$, 0.70 V; and $V_C$, −0.60 V. The total amounts of hydrogen and triiodide recovered were each 2.8 mole, representing 100% current efficiency. A total of 2.06 mole $H_2S$ (22.8% $H_2S$ in $N_2$) was passed through the chemical reactor during this period, and 1.80 mole of elemental sulfur was recovered. This amount represents 88% of the sulfur added as $H_2S$ and coupled with the fact that a significant amount of $H_2S$ was found in the off-gas from the chemical reactor indicated that a more efficient chemical reactor should be employed.

This example shows a power consumption of 2.5 Kwh/lb of sulfur.

EXAMPLE 8

The experimental set-up in this example was the same as that in Example 7, except that the chemical reactor was packed with glass beads (ca. 4 mm in diameter) in this example to enhance contact between gaseous $H_2S$ and aqueous acidic triiodide. At 50 A, $V_{A-C}$ was 2.24 V after passing $5.4 \times 10^5$ coulombs; $V_A$, 0.74 V; and $V_C$, −0.72 V. The total amounts of hydrogen and triiodide produced were each 2.8 mole, representing 100% current efficiency. A total of 1.88 mole $H_2S$ (22.8% $H_2S$ in $N_2$) was passed through the chemical reactor packed with glass beads. Total sulfur recovered was 1.68 mole, representing a sulfur recovery efficiency of 89%. A significant amount of $H_2S$ was detected in the off-gas from the chemical reactor indicating poor scrubbing efficiency and the need for a better chemical reactor design.

This example shows a power consumption of 2.84 Kwh/lb of sulfur.

EXAMPLE 9

The experimental set-up in this example was the same as that in Example 1, except that the initial anolyte composition was 2.2M $I_2$+5.5M HI, and the initial catholyte composition was 6M HCl. At 50 A, $V_{A-C}$ after $5.4 \times 10^5$ coulombs had passed was 2.34 V; $V_A$, 0.83 V; and $V_C$, −0.54 V. Hydrogen production (2.8 mole) still corresponded to 100% current efficiency.

EXAMPLE 10

In this example, the experimental set-up was the same as that in Example 1, except that the initial anolyte composition was 1.8M $I_2$+5.5M HI, the initial catholyte composition was 3M $H_2SO_4$, and the membrane was "Nafion 117". At 50 A, $V_{A-C}$ was 2.2 V after $1.35 \times 10^5$ coulombs had passed; $V_A$, 0.83 V; and $V_C$, −0.64 V.

EXAMPLE 11

The experimental set-up in this example was the same as that in Example 10, except that the initial catholyte composition was 9M $H_2SO_4$. At 50 A, $V_{A-C}$ after passing $1.35 \times 10^5$ coulombs was 2.85 V; $V_A$, 0.62 V; and $V_C$, $-0.83$ V.

In all of the above examples, the pH range for the iodide anolyte was in the range of 0 to 1.

To explore the process further, runs were made using a pH range of 13 to 14. Three of these runs were reported for comparison's sake as Examples 12, 13 and 14. Specifically, from the power consumption figures given, it will be seen that the basic system is less attractive than the acidic one, even though these results show considerably lower power consumption than shown by Keller, Jr., discussed above.

BASIC PROCESS (pH=13-14)

EXAMPLE 12

In this example, the MP cell was fitted with a graphite plate anode ("Ultra Carbon Company, grade UF-4S"), onto which a coating of 500 Å of platinum had been deposited by electron-beam evaporation; a platinum-coated titanium plate cathode (Swedish National Development Company) that had been platinized to increase its surface roughness; and a "Nafion 390" cation-exchange membrane. The initial anolyte composition was $0.275M\ IO_3^- + 1.52M\ I^- + 1.6M\ OH^-$ with $Na^+/K^+ = 1$. The initial catholyte composition was 3M $KOH + 3M\ NaOH$. Electrolyte flow rates were 1-14 l/min; in this range, the electrochemical performance was not sensitive to electrolyte flow rate. At a current of 40 A, $V_{A-C}$ after passing $8.28 \times 10^5$ coulombs was 4.80 V; $V_A$, 1.41 V; and $V_C$, $-1.71$ V. Total amounts of hydrogen and iodate produced were 4.29 and 1.43 mole, respectively, for 100% current efficiency. A total of 2.74 mole $H_2S$ (23.86% $H_2S$ in $N_2$) was passed through the chemical reactor during this period, and 2.44 mole of sulfur was recovered. No $H_2S$ was detected in the gas stream exiting from the chemical reactor. This represents a sulfur recovery efficiency of 89%.

Power consumption was 5.13 Kwh/lb of sulfur.

EXAMPLE 13

The experimental set-up in this example was the same as that in Example 12, except that a glassy carbon plate anode (Materials Research Corporation) was employed in this example. At 50 A, $V_{A-C}$ after passing $5.4 \times 10^5$ coulombs was 5.12 V; $V_A$, 1.31 V; and $V_C$, $-1.76$ V. Total hydrogen and iodate production amounted to 2.8 and 0.93 mole, respectively, for 100% current efficiency. A total of 2.13 mole $H_2S$ was passed through the chemical reactor during this period, and 1.64 mole of elemental sulfur was recovered, representing a 77% sulfur recovery efficiency based on the amount of $H_2S$ treated. No $H_2S$ was detected in the gas stream exiting from the chemical reactor.

Power consumption was 6.6 Kwh/lb of sulfur.

EXAMPLE 14

The experimental set-up in this example was the same as that in Example 13. At 50 A, $V_{A-C}$ after passing $9.13 \times 10^5$ coulombs was 5.78 V; $V_A$, 1.43 V; and $V_C$, $-1.94$ V. Total hydrogen and iodate production was 4.74 and 1.58 mole, respectively, for 100% current efficiency. A total of 2.88 mole $H_2S$ was passed through the chemical reactor, and 2.28 mole of elemental sulfur was recovered, for a 79% sulfur recovery efficiency based on the amount of $H_2S$ treated. No $H_2S$ was detected in the gas stream exiting from the chemical reactor.

Power consumption was 9.13 Kwh/lb of sulfur.

In Examples 12, 13 and 14 wherein the process was operated at high pH (namely 13-14), it is obvious that some of the sulfur introduced as $H_2S$ was transformed into a chemical species different than the desired elemental sulfur. The basis for this statement is the amount of elemental sulfur recovered as compared to the amount of $H_2S$ removed from the gas stream coupled with the fact that no $H_2S$ was detected in the off-gas from the chemical reactor. Examination of the anolytes after these runs indicated that the appropriate amount of sulfur in each example was found dissolved in the anolyte in some soluble form, presumably as sulfate, which accounted for the difference between the amount of $H_2S$ treated and the amount of elemental sulfur recovered.

Considerations of the thermodynamics of the system led to an explanation of the low elemental sulfur recovery in basic media. Elemental sulfur is thermodynamically unstable in contact with aqueous solutions above pH=8. This instability is extended to the entire normal pH range (0-14) in the presence of an oxidant such as iodine resulting in the production of soluble sulfate ions according to the following reaction:

$$S + 4H_2O + 3I_3^- \rightarrow SO_4^= + 8H^+ + 9I^-$$

A reaction voltage which shows the spontaneity of this reaction can be approximated by the following expression:

$$E_{rxn} = -0.199 - 0.0788\ pH - 0.0295\ \log\frac{[I_3^-]}{[I^-]^3}$$

A negative value for $E_{rxn}$ indicates a spontaneous reaction. Assuming values of $[I_3^-]$ and $[I^-]$ which correspond to our reaction conditions, the pH dependence of the spontaneity of this reaction is shown by FIG. 2. This behavior indicates that elemental sulfur is unstable in contact with an aqueous solution containing an oxidant as strong as the triiodide ion. Likewise, the use of a stronger oxidant such as bromine or chlorine under the same pH conditions would present a situation in which the elemental sulfur is even more unstable (the instability being proportional to the increasing oxidizing power of the other halogens). This was demonstrated experimentally by the treatment of solid elemental sulfur with an acid solution of bromine (as $Br_3^-$). A significant fraction of the elemental sulfur was converted to soluble sulfate ions in a short time. From the values of $E_{rxn}$ noted in FIG. 2, it can be concluded that if a process is to be carried out in which elemental sulfur is held in contact with an aqueous solution containing iodine oxidants, our process minimizes the propensity of the sulfur to undergo an undesirable oxidation reaction which would diminish the elemental sulfur recovery efficiency. From the observed sulfur yields at low pH values (0-1), it is apparent that the kinetics of the sulfur oxidation reaction are suppressed by the high proton concentrations.

Obvious modification of the invention can be made in view of the general description. A basic objective is to provide a process which goes beyond present hydrogen sulfide treating technology and results in the conversion of hydrogen sulfide to yield elemental sulfur and hydrogen. The process described shows the utilization of technology in three critical areas, namely:

1. The electrochemical oxidation of iodide in aqueous acidic solution having a pH of 0 to 1;
2. The efficient scrubbing of hydrogen sulfide gas with the acidic triiodide solution;
3. The production of elemental sulfur of comparable quality to that presently recovered from petroleum and natural gas sources.

We claim:

1. A process for converting the $H_2S$ in a gaseous or non-aqueous liquid stream to hydrogen and elemental sulfur comprising feeding to a reaction zone said stream and an anolyte containing $I_3^-$ as an oxidant at a pH of 0 to 1 from a first reservoir to effect the following reaction:

$$I_3^- + H_2S \rightarrow 2H^+ + 3I^- + S$$

removing $H_2S$-free stream from said reaction zone, removing anolyte-containing solid sulfur from said reaction zone, removing sulfur from anolyte containing same, returning sulfur-free anolyte to said first reservoir, providing an electrolysis cell having a membrane therein to separate said cell into anode and cathode chambers, establishing a voltage across said cell, providing a second reservoir; passing an acid from said second reservoir to said cathode chamber and from said cathode chamber back to said second reservoir, removing hydrogen from said acid returned to said second reservoir, passing an $I_3^-$-depleted stream from said first reservoir to said anode chamber and an $I_3^-$ rich stream from said anode chamber to said first reservoir.

2. The process of claim 1 wherein said anolyte is prepared by mixing iodine and hydriodic acid and said catholyte is hydrochloric or sulfuric acid.

3. The process of claim 1 wherein the sulfur recovered from the system, the "acid" sulfur, is recovered in purified form by treating same with an organic solvent capable of dissolving elemental sulfur at a temperature above 95° C.

4. The process of claim 3 wherein said sulfur is dissolved in boiling toluene or xylene, the resulting solution is cooled to precipitate crystalline elemental sulfur, and said sulfur is separated from said toluene or xylene.

5. The process of claim 1 wherein the voltage across the electrolysis cell is less than 3 volts.

6. The process of claim 1 wherein the power consumption is 1-4 Kwh/lb of sulfur.

* * * * *